US012003590B2

United States Patent
Klahre et al.

(10) Patent No.: US 12,003,590 B2
(45) Date of Patent: Jun. 4, 2024

(54) PERFORMANCE-ENHANCING CROSS-SYSTEM REQUEST HANDLING VIA SHARED MEMORY CACHE

(71) Applicant: SAP SE, Walldorf (DE)

(72) Inventors: Andre Klahre, Angelbachtal (DE); Michael Hettich, Heidelberg (DE); Nitish Kumar, Leimen (DE); Christine Schaefer, Nussloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/968,648

(22) Filed: Oct. 18, 2022

(65) Prior Publication Data
US 2024/0129374 A1  Apr. 18, 2024

(51) Int. Cl.
G06F 15/173 (2006.01)
H04L 67/00 (2022.01)
H04L 67/565 (2022.01)

(52) U.S. Cl.
CPC ............ *H04L 67/34* (2013.01); *H04L 67/565* (2022.05)

(58) Field of Classification Search
None
See application file for complete search history.

(56) References Cited

U.S. PATENT DOCUMENTS

| | | | | |
|---|---|---|---|---|
| 11,500,824 B1* | 11/2022 | Tighe | ................ | G06F 16/2452 |
| 2015/0039674 A1* | 2/2015 | Agarwal | .............. | H04L 67/563 |
| | | | | 709/203 |
| 2015/0095474 A1* | 4/2015 | Sarkar | .................... | H04L 41/28 |
| | | | | 709/223 |
| 2019/0065014 A1* | 2/2019 | Richter | .................. | G06T 11/60 |

OTHER PUBLICATIONS

"SAP Teamcenter by Siemens," sap.com, Sep. 12, 2022, 10 pages.
Kesari, "CDS-Fiori Elements—Object Page Facets—My Experiments with ABAP," samplecodeabap.com, Feb. 25, 2020, 12 pages.
"Facet Filter," *SAPUI5: UI Development Toolkit for HTML5*, help.sap.com, Sep. 28, 2022, 3 pages.
"Performance Issues: Don't use visibility for lazy instantiation," *SAPUI5: UI Development Toolkit for HTML5*, help.sap.com, Sep. 28, 2022, 3 pages.
Djomo, "Getting Started with the ABAP RESTful Application Programming Model (RAP)," blogs.sap.com, Oct. 25, 2019, 24 pages.

* cited by examiner

*Primary Examiner* — Phuoc H Nguyen
(74) *Attorney, Agent, or Firm* — Klarquist Sparkman, LLP (57) ABSTRACT

In a scenario involving a primary and secondary server, resource requests can be managed to avoid sending multiple requests to the secondary server. In particular, requests for data object attributes can be queued when another request has already been made. Hashkey and locking mechanisms can be used to support scenarios involving multiple users and multiple data object instances. Performance of the overall system landscape can thus be improved by effectively consolidating resource requests.

18 Claims, 9 Drawing Sheets

◁ SAP Product Version Data

Standard \* ▶
Not Filtered

Product Version List (1.234.668)

| ID | Version |
|---|---|
| 71-199-PV-01AS4 | A |
| 111222 | A |
| 111756 | A |
| 111758 | A |

111222 — 622

General Data | Names — 624 | Descriptions — 626 | Extension Fields — 628

General Data

Valid From:
05.03.2020, 16:28:34

Base UoM:
PCE

Basic Material:
metal

Weight:
1 KGM

Length:
0.5000000 MMT

Width:
0,5000000 MMT

Height:
0.20000000 MMT

Size UoM:
MMT

PERFORMANCE-ENHANCING CROSS-SYSTEM REQUEST HANDLING VIA SHARED MEMORY CACHE

FIELD

The field generally relates to Web applications and handling resource requests originating from a client user interface.

BACKGROUND

Presenting a user interface for a software application involves displaying data for user consideration. Although it initially appears to be a simple matter to display a value in the user interface, the actual logistics involved in doing so can become complicated in real-world Web and cloud-based scenarios.

For example, in an application development framework, certain requests for values may be automatically generated in order to make application development simpler or more accessible to users. However, such an arrangement can sometimes involve unnecessary consumption of resources, leading to degraded application performance. Accordingly, improvements in the field are still needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises, at a primary server, from a client computer with a user interface comprising a plurality of facets, receiving a plurality of resource requests for attributes of a same data object instance stored at a secondary server to be displayed in the plurality of facets at the client computer; for a first resource request out of the resource requests for attributes of the same data object instance, requesting requested attributes of the data object instance from the secondary server; for a second resource request out of the resource requests for attributes of the same data object instance, responsive to determining that the first resource request for the data object instance has already been made, queuing the second resource request without relaying it to the secondary server; receiving the requested attributes of the data object instance from the secondary server; storing the received requested attributes of the data object instance; and fulfilling the queued, second resource request with the stored received requested attributes of the data object instance already received from the secondary server.

In another embodiment, a system comprises a client computer displaying a plurality of facets in a user interface, wherein the client computer is configured to send a plurality of resource requests for attributes of a data object instance to be displayed in the plurality of facets; a primary server computer configured to receive and fulfill the resource requests for attributes of the data object instance from the client computer, wherein the primary server computer is configured to queue a second resource request for attributes of the data object instance responsive to determining that a first resource request for attributes of the data object instance has already been received; wherein the primary server computer comprises a shared memory and is further configured to store the attributes of the data object instance received as a result of the first resource request to a secondary server computer in the shared memory and provide access to the attributes in the shared memory to the queued, second resource request, whereby a separate resource request to the secondary server computer for the second resource request for attributes of the data object instance is avoided.

In another embodiment, one or more non-transitory computer-readable media having stored therein computer-executable instructions that when executed by a computing system, cause the computing system to perform, at a primary server, from a client computer with a user interface comprising a plurality of facets, receiving a plurality of resource requests for attributes of a same data object instance stored at a secondary server to be displayed in the plurality of facets at the client computer; for a first resource request out of the resource requests for attributes of the same data object instance, requesting a full set of requested attributes of the data object instance from the secondary server; for a second resource request out of the resource requests for attributes of the same data object instance, responsive to determining that the first resource request for the data object instance has already been received, queuing the second resource request without relaying it to the secondary server, wherein the queuing employs a lock identified by hashkey calculated via a user identifier associated with both the first resource request and the second resource request; receiving the full set of requested attributes of the data object instance from the secondary server; storing the received full set of requested attributes of the data object instance; and fulfilling the queued, second resource request from the stored full set of requested attributes of the data object instance already received from the secondary server, whereby a second resource request to the secondary server is avoided.

As described herein, a variety of features and advantages can be incorporated into the technologies as desired.

DETAILED DESCRIPTION

Example 1—Overview

Although there are already known mechanisms for caching data, they can prove to be inefficient in certain user interface scenarios. For example, in a situation where the user interface framework generates requests for data to be displayed, a phenomenon can arise where there are multiple parallel requests made for attributes of the same data object. Left unchecked, such requests can unnecessarily degrade performance.

As described herein, in a situation where a plurality of requests for attributes of the same data object are involved, requests after the first can be queued, waiting for results from the first request, which can be provided in a shared memory area from which the second and subsequent requests can be fulfilled.

As described herein, a locking mechanism can be used to block subsequent requests until the first request completes. Orchestration of the requests can be achieved via a hashkey calculated based on an object identifier, user identifier, and the like. Thus, a system can support multiple users accessing multiple objects.

Such technologies can be particularly useful in cross-platform scenarios where the attributes of a data object reside on a secondary server. For example, a secondary server may be part of a secondary platform that does not support fine-grained access to attributes. Thus, multiple requests for different sets of attributes can result in overburdening the secondary server, which is a source of performance degradation.

The technologies described herein can be helpfully implemented as part of a user interface framework built on RESTful architecture, HTML 5, and the like, to improve performance, especially when such a user interface framework implements lazy loading that results in multiple resource requests.

Various benefits include maintaining the data on the secondary server, instead of creating a local copy that could improve performance but raise synchronization issues that consume additional computing resources and put data integrity at risk.

The overall number of resource requests to the secondary server can be reduced. Total cost of ownership is reduced by not relaying all resource requests to the secondary server.

The described technologies thus offer considerable improvements over conventional techniques.

Figure 1:
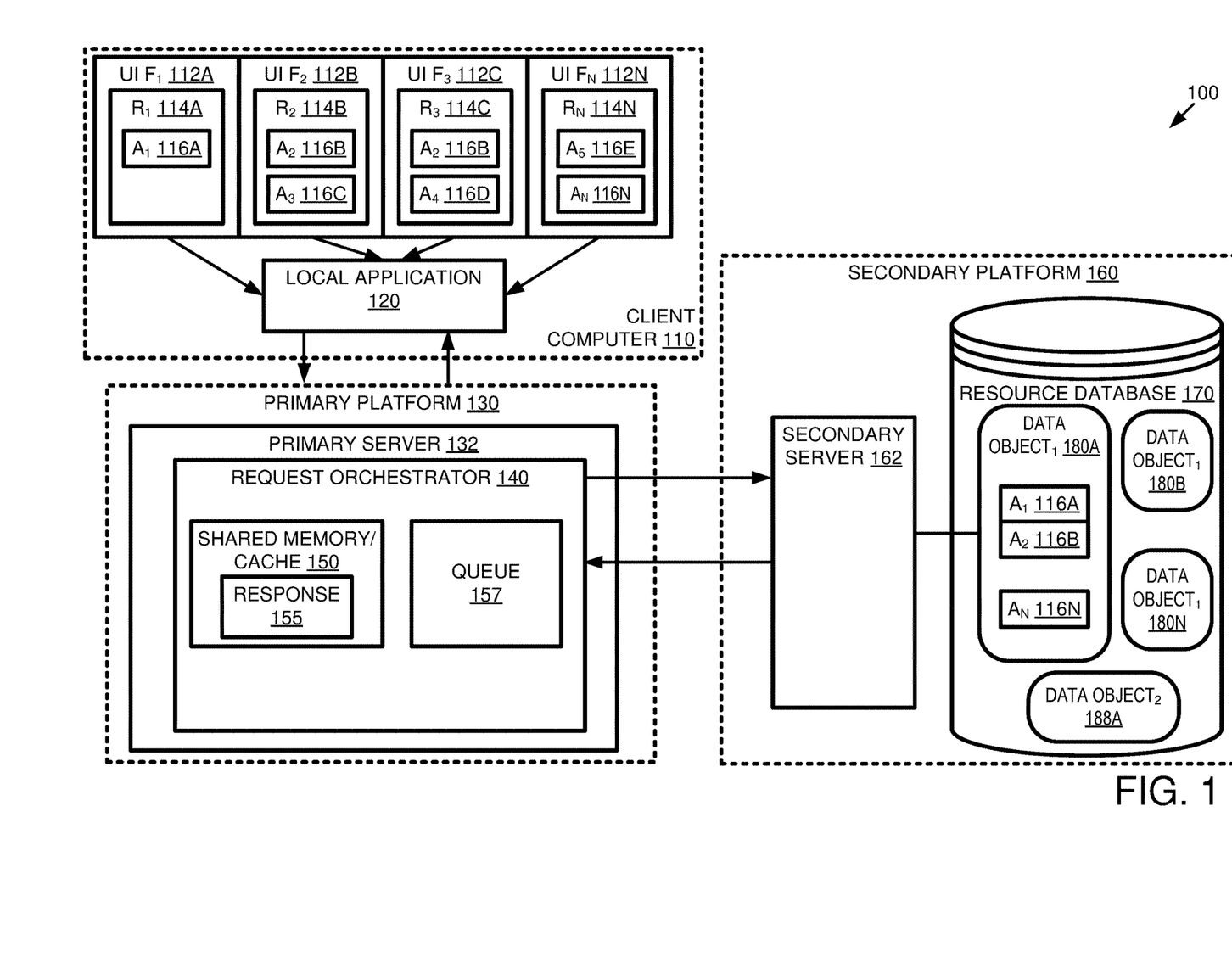
FIG. 1 is a block diagram of an example system implementing performance-enhancing cross-system request handling via shared memory cache.

Example 2—Example System Implementing Performance-Enhancing Cross-System Request Handling Via Shared Memory Cache FIG. 1 is a block diagram of an example system 100 implementing performance-enhancing cross-system request handling via shared memory cache. In the example, a client computing system 110 is executing a local application 120 that displays a user interface comprising a plurality of facets 112A-N that display a plurality of attributes 116A-N of a data object. As shown, the attributes 116A-N are managed at the secondary platform 160. For example, the attributes 116A-N are stored at a database 170 accessible by the secondary server 162 and provided by the secondary server 162 in response to requests for the same. In practice, the local application 120 can be any of a variety of applications presented in a standard Web browser.

As described herein, display of the facets 112A-N can cause the local application 120 to send a plurality of resource requests 114A-N to the primary server 132. In the example, one resource request is sent per facet, but other arrangements are possible. As shown, the resource requests 114A-N can comprise requests for different attributes of a same data object. In the example, there is some overlap, but overlap is not required. In practice, sending such multiple requests can be characterized as a shortcoming in the system because conventionally, it later results in multiple separate requests to the secondary platform 160. However, such a shortcoming can be mitigated as described herein.

The primary server 132 is configured to receive the requests 114A-N from the client computer 110. As shown, the primary server 132 can be part of a primary platform 130 and is in communication with a secondary server 162 of a secondary platform 160.

The primary server 132 comprises a request orchestrator 140 that serves as a service provider for the application framework to increase performance as described herein. The request orchestrator can receive resource requests and perform the functions described herein to request resources from the secondary server 162 while maintaining the shared memory/cache 150 and the queue 157. As described herein, the orchestrator can implement a locking mechanism to block resource requests until resources are available. In practice, a response 155 from the secondary server 162 is stored in the shared memory/cache 150 for use by queued requests.

The secondary server 162 executes under a secondary platform 160 and is configured to receive requests for attributes of data object instances from the primary server 132. The secondary server 162 can respond by providing the requested attributes in response. As shown, the secondary server can access a resource database 170 that comprises instances 180A-N, 188A of different data object classes. Such instances in turn store the attributes 116A-N of the data object instances.

The local application 120 can be implemented as a RESTful application (e.g., that interacts with a RESTful Web service provided by the secondary server 162) that is presented by a local browser of a client computer. For example, HTML, JavaScript, XML, and the like can be combined into a local application (e.g., via SAP Fiori or similar frameworks). In practice, any user interface technology can be used to present a user interface (e.g., in a standard web browser). Although an HTML 5-based framework can be used, the technologies can provide benefit regardless of the details of the client-side browser.

The request orchestrator 140 can function as an integration service provider in that it integrates the primary platform 130 and the secondary platform 160. For example, the local application 120 can provide data managed by the primary platform 130 in conjunction with data managed by the secondary platform 160. As described herein, an alternative would be to replicate the data of the secondary platform 160 to the primary platform 130, thus avoiding performance issues with requesting data from the secondary server 162. However, such an arrangement raises synchronization issues as described herein.

In practice, the systems shown herein, such as system 100, can vary in complexity, with additional functionality, more complex components, and the like. For example, in practice, the number of attributes in a facet can greatly exceed those shown in FIG. 1. In fact, the technologies provide great benefit in scenarios involving many users operating computers requesting various data objects. Additional components can be included to implement security, redundancy, load balancing, report design, and the like.

Although some computing systems use a singular form (e.g., client computer, primary server, secondary server, or the like), in practice, such computing systems can comprise plural computers (e.g., a server farm, data center, or the like).

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the response 155, attributes 116A-N, and the like can be stored (e.g., persisted) in one or more computer-readable storage media or computer-readable storage devices. The technologies described herein can be generic to the specifics of operating systems or hardware and can be applied in any variety of environments to take advantage of the described features.

Figure 2:
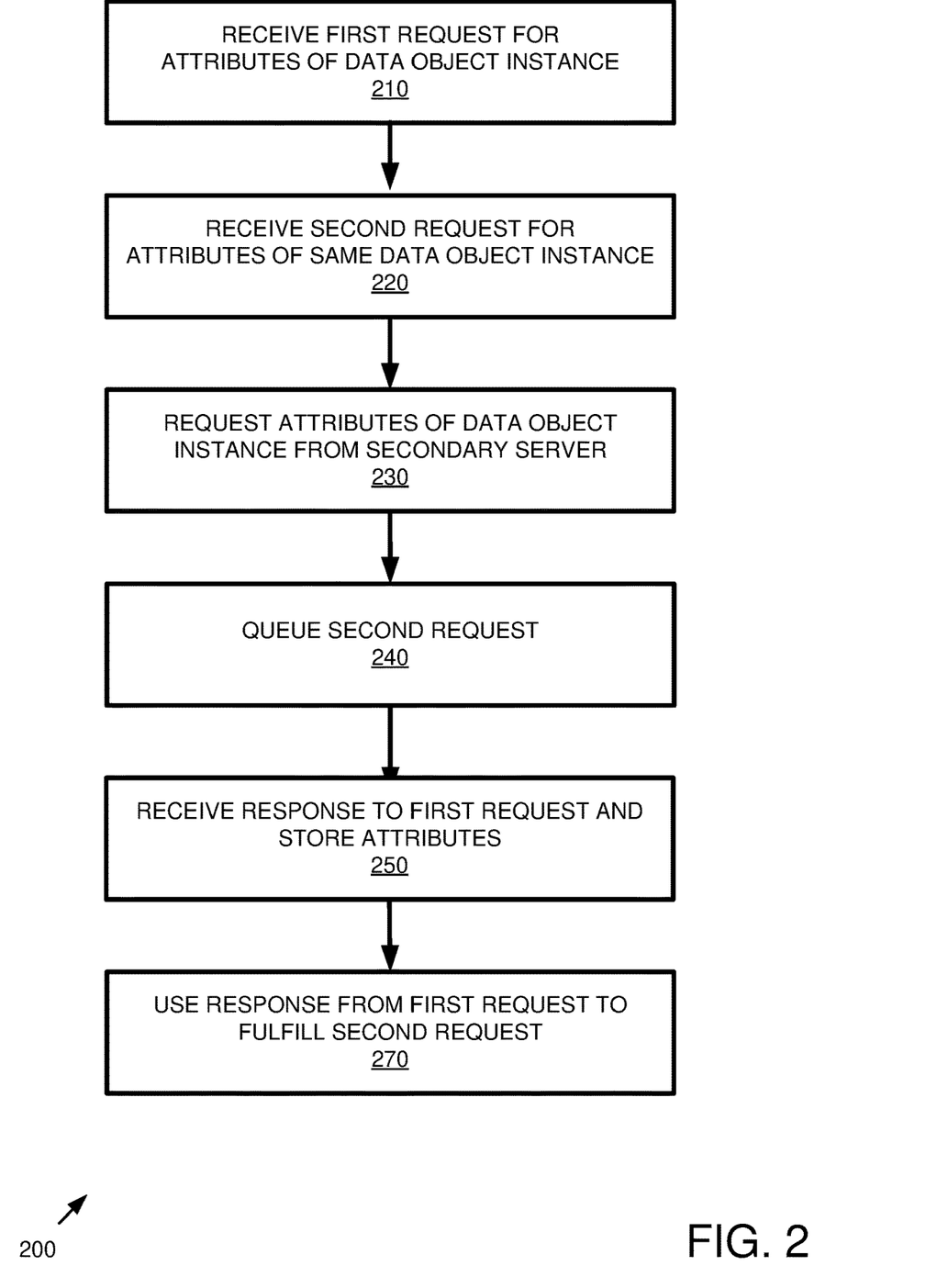
FIG. 2 is a flowchart of an example method of performance-enhancing cross-system request handling via shared memory cache.

Example 3—Example Method of Performance-Enhancing Cross-System Request Handling Via Shared Memory Cache FIG. 2 is a flowchart of an example method 200 of performance-enhancing cross-system request handling via shared memory cache and can be performed, for example, by the system of FIG. 1 (e.g., from the perspective of the primary server). As described herein, the primary server can be part of a first platform, and the secondary server can be part of a second platform of a different type than the first. For example, the first platform can support finer grained access to data object instance attributes than the second platform, or the secondary server can simply not support fine-grained access to attributes of the data object instances requested.

Although the example describes a situation with a single user accessing a single object, in practice, a variety of resource requests can be processed. For example, requests from different users for different objects can be involved.

The resource requests can be received at a primary server from a client computer with a user interface comprising a plurality of facets.

At 210, a first resource request for attributes of a data object instance stored at a secondary server to be displayed in one of the facets at the client computer is received.

At 220, a second resource request for attributes of the same data object instance stored at the secondary server to be displayed in another one of the facets at the client computer is received.

Thus, at a primary server, from a client computer with a user interface comprising a plurality of facets, a plurality of resource requests for attributes of a same data object instance stored at a secondary server to be displayed in the plurality of facets at the client computer are received. In practice, the second resource request comprises a request for at least one attribute of the same data object instance that is not requested by the first resource request. The facets can display different attributes of the data object instance, although attribute overlap can be supported.

The attributes of the data object instance can be included in an integrated hybrid object that comprises attributes managed natively (e.g., at the primary server) and attributes managed at the secondary server, whereby data federation without replication is implemented.

In practice, a hashkey and locking mechanism can be implemented to manage the requests as described herein.

At 230, requested attributes of the data object instance are requested from the secondary server. Such a request can be described as for the first resource request; however, in practice, the requested attributes can be a full set of attributes of the data object instance, and the attributes of the first resource request are a proper subset of the full set. By requesting more attributes than actually needed, the remaining attributes can be used by subsequent requests for attributes of the same data object instance.

At 240, responsive to determining that the first request for the data object instance has already been made, the second resource request can be queued without relaying it to the secondary server. As described herein, determining whether the first request has already been made can comprise calculating a hashkey (e.g., based on an identifier of the data object instance, a user identifier, and the like). In a lock scenario, a lock can be acquired for the first request, and the second request can wait on the lock; the lock can be released responsive to fulfilling the first request. Again, the lock can be identified via a hashkey calculated based on an identifier of the data object instance and a user identifier. Thus, queuing can employ a lock identified by a hashkey calculated via a user identifier associated with both the first resource request and the second resource request.

At 250, a response from the secondary server is received. The response comprises the requested attributes of the data object instance. The attributes are then stored (e.g., in shared memory that is accessible to the other resource requests).

Then, at 270, the queued, second resource request is fulfilled with the stored requested attributes of the data instance already received from the secondary server. As described herein, the requested attributes can be stored in a shared memory cache, and the second resource request can read one or more of the requested attributes from the shared memory cache.

After the second resource request is fulfilled, it can be dequeued.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, receiving results can be described as sending results depending on perspective.

Example 4—Example Data Object

In any of the examples herein, a data object can take the form of a collection of attributes, functions (e.g., methods), or both. A data object comprises one or more attributes that can take the form of attribute name, attribute value pairs (e.g., "product UoM" "kg"). Attributes are sometimes called "fields" or "data members." The attribute name need not be explicitly stored because position or location of the value can indicate which attribute name is involved. Similarly, attribute values can be represented via attribute code, data dictionary, or the like.

Different platforms can manage data objects in different ways, so that the technologies that provide the attributes of data objects can differ. In some cases, a data object can take the form of a logical data object that is supported by a variety of technologies to ease development and/or management of the object. For example, SAP's Core Data Services provides a robust set of functionality to automate logical data object management and can be implemented in the primary platform described herein. A secondary platform may not support Core Data Services but may have some functionality for supporting data objects.

In practice, external data objects can be modeled as Core Data Services objects, providing the benefits of such services in a federated data scenario.

Example 5—Example Resource Request

In any of the examples herein, a resource request can take the form of a request for resources such as the attributes of a data object. In practice, such resource requests can take any of a variety of forms, such as a request to an OData service, a request to a microservice implementing RESTful APIs, or the like.

In any of the examples herein, the first resource request can be for a different subset of the data object attributes than the second resource requests. Overlap between the subsets can be supported but is not required.

Example 6—Example Local Application

In any of the examples herein, a local application can be any application that displays a user interface comprising attributes as described herein. As shown, some attributes are fetched from a remote source, such as a primary server, which in turn fetches attributes from a secondary server that operates under a different platform than the primary server. The technologies can be particularly helpful for RESTful applications.

Example 7—Example Facet

In any of the examples herein, a facet can be a section of a user interface that visually presents information as a collection. For example, one facet may show some attributes of a data object, while another facet shows other attributes. A typical example is a facet showing General Data, a facet showing Names, a facet showing Descriptions, and the like. Extension fields can be presented on a separate facet.

In practice, facets can be displayed in different panes in the user interface for ease of navigation.

Attribute overlap between facets is possible, but in practice, a facet typically contains at least one attribute that is absent from another facet.

Example 8—Example Error Processing

In any of the examples herein, errors can be handled to address performance considerations. For example, if a first request fails, the failure result can be provided to subsequent requests for the same object instance (e.g., instead of relaying further requests).

Example 9—Example Cross-System Operation

In any of the examples herein, cross-system operation can be supported. For example, the resource requests can be received by a first server that then fulfills the requests by requesting information from a second server. In practice, such a second server can be operated by a third party. Thus, the technologies can perform well even if the third party is unaware or has not engineered the second server to perform well with the web application. In practice, the primary server can operate under a primary platform, and the secondary server can operate under a second platform as shown herein.

The technologies can thus achieve integration between two platforms. If desired, a hybrid object can show attributes managed at primary platform along with attributes managed at a secondary platform (e.g., as a logical data object).

An example cross-system implementation arises when integrating SAP's S/4HANA system (e.g., with Fiori providing the user interface) with external systems on a different platform. While the SAP S/4HANA system may have mechanisms in place to address performance considerations, when integrating with an external platform, such mechanisms may not be propagated to the external system, or the external system may have a different architecture. In such a case, there can be performance issues related to processing multiple resource requests instead of sending a single resource request. For example, the secondary (external) platform may not support finer granularity access to data object attributes. The technologies described herein can address such a situation by queuing subsequent requests as described. Thus, the overall system landscape can be taken into account to improve performance of the overall system.

Example 10—Example Resource Request Processing

Figure 3:
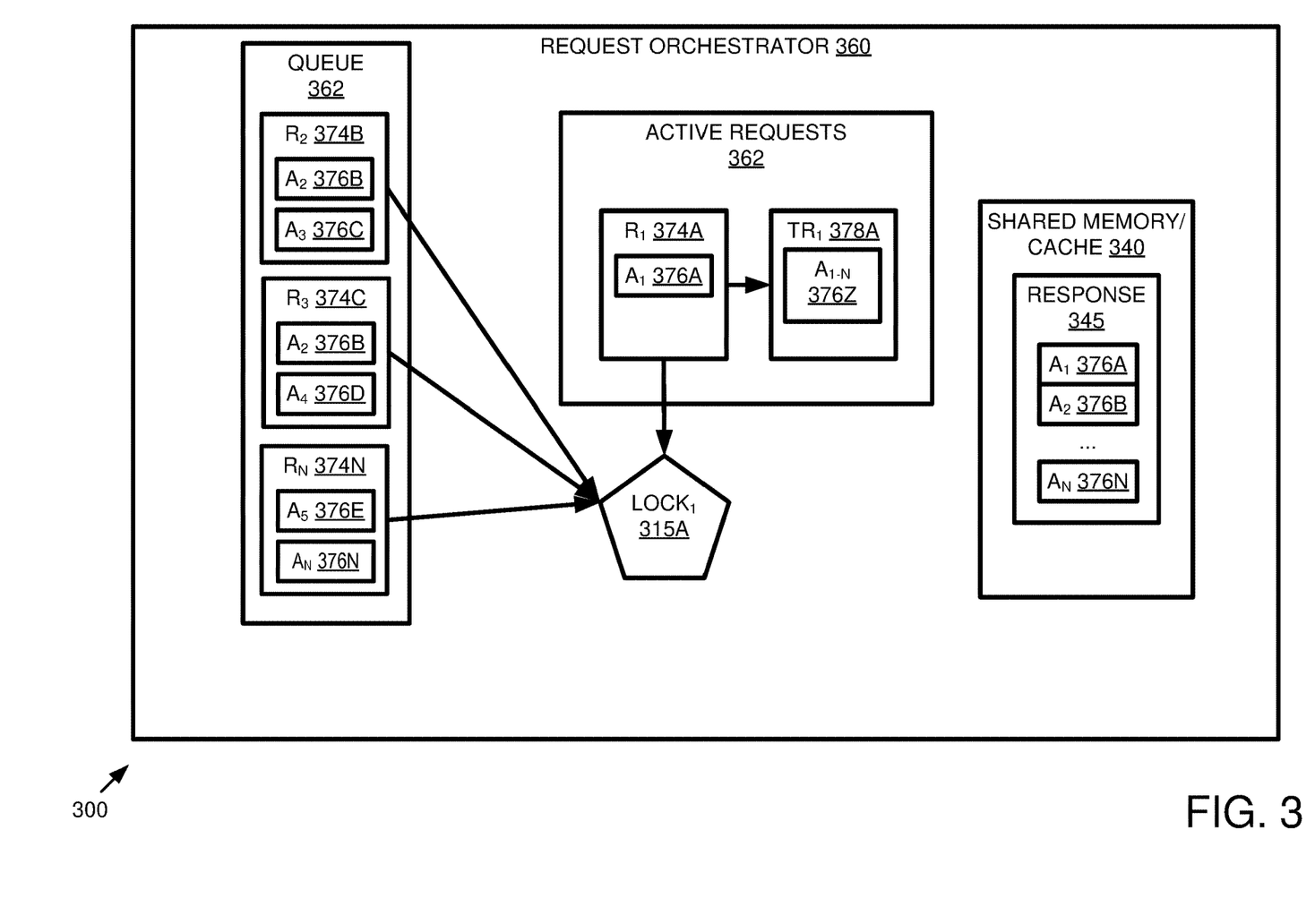
FIG. 3 is a block diagram of an example system implementing processing resource requests.

FIG. 3 is a block diagram of an example system 300 processing resource requests that can be implemented in any of the examples herein to achieve resource request fulfillment. In the example, a resource orchestrator 360 is configured to receive and fulfill resource requests from a client application.

A hashkey is calculated for incoming requests as described herein. The hashkey can be used to determine that no prior request has already been made for the data object instance for a particular user. In such a case, the request 374A becomes active and results in a request 378A to the secondary server for a full set of attributes 376Z. In some cases, the incoming request may need to be translated or mapped. For example, the incoming request may be for a data object that has an equivalent or integrated data object with a different identifier at the secondary server.

In an implementation using locks, the first request 374A can acquire a lock 315A. Subsequent requests 374B-N for attributes 376B-N of the same data object instance can be queued as they wait on the lock 315A. The lock 315A can be identified via the hashkey as described herein.

The response 345 to the request to the secondary server can comprise a full set 376A-N of the attributes of the data object instance and can be stored as a class instance. As described herein, the class instance may include further fields that are managed locally, or the class instance attributes may be integrated into a subsuming logical data object.

Upon fulfillment of the request, the lock is released, allowing the other requests in the queue to proceed with reading the attributes from the response 345 in the shared memory/cache 340.

In practice, a wide variety of rich functionality can be provided to handle error processing and the like.

Example 11—Example Method of Processing Resource Requests

Figure 4:
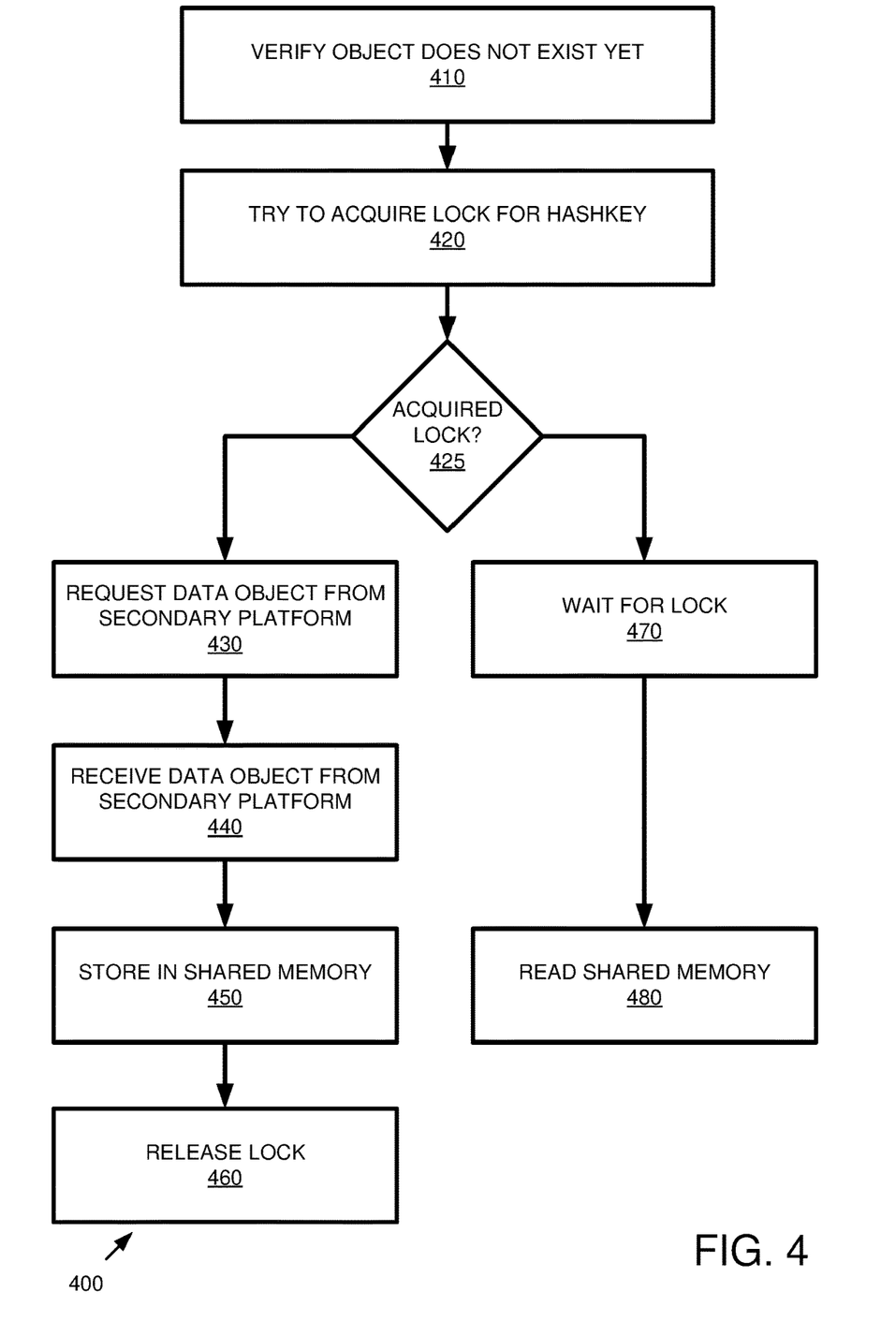
FIG. 4 is a flowchart of an example method of processing resource requests.

FIG. 4 is a flowchart of an example method 400 of processing resource requests and can be implemented, for example, by the system of FIG. 3.

In the example, at 410, it is verified that the object does not yet exist (e.g., that the attributes are not already locally available). A hashkey can be calculated based on the data object identifier and user identifier as described herein. The hashkey can then be used to attempt to acquire the lock identified by the hashkey at 420.

A determination 425 is made of whether the lock was acquired. If so, the data object instance is requested from the secondary platform at 430. As described herein, a full set of attributes can be requested, even if the incoming request requests a subset of the attributes. Then, at 440 the data object (e.g., attributes) from the secondary platform are received and stored 450 in shared memory. The lock is then released at 460.

If the lock was not acquired, then the resource request waits for the lock 470. Upon release, the resource request can read 480 the data object attributes from the shared memory.

Example 12—Example Hashkey

Figure 5:
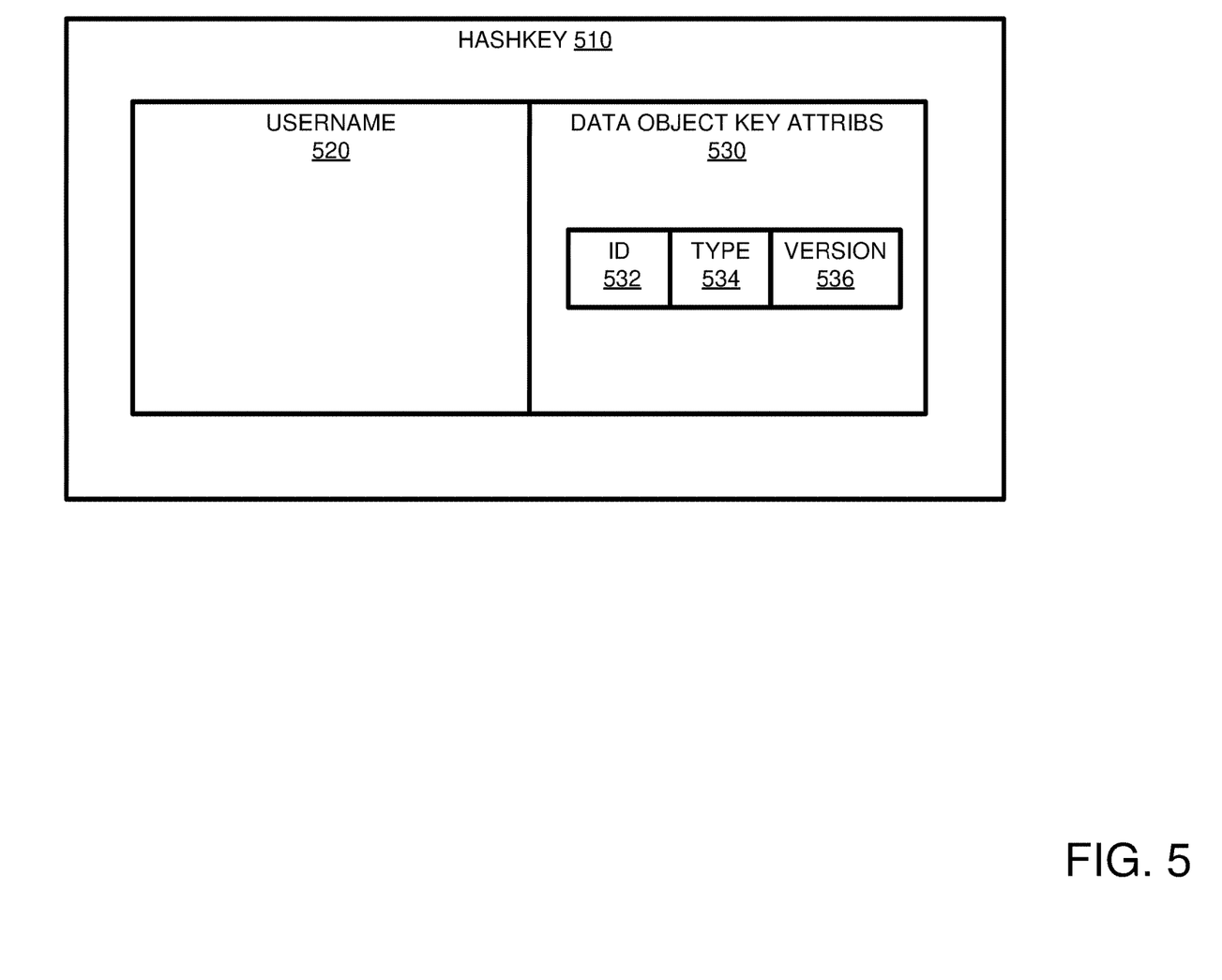
FIG. 5 is a block diagram of an example hashkey.

FIG. 5 is a block diagram of an example hashkey 510 for use during orchestration of resource requests that can be used in any of the examples herein. object attributes can be queued when another request has already been made. Such an arrangement can be used to support scenarios involving multiple users and multiple data object instances; users and data object instances can be differentiated by the hashkey 510. At a basic level, the hashkey is based on the username 520 and data object identifier 532 (e.g., an identifier of a particular instance of the data object). The data object key attributes 530 can include the data object identifier 532, type (e.g., class) 534, and version 536. Additional or alternative fields can be included as desired.

Although the drawing shows the values as inside the hashkey 510, in practice, the hashkey can be a concatenation, but could alternatively be some other calculation performed on the input values to yield the hashkey 510. Collisions can be handled as needed.

Example 13—Example User Interface

Figure 6:
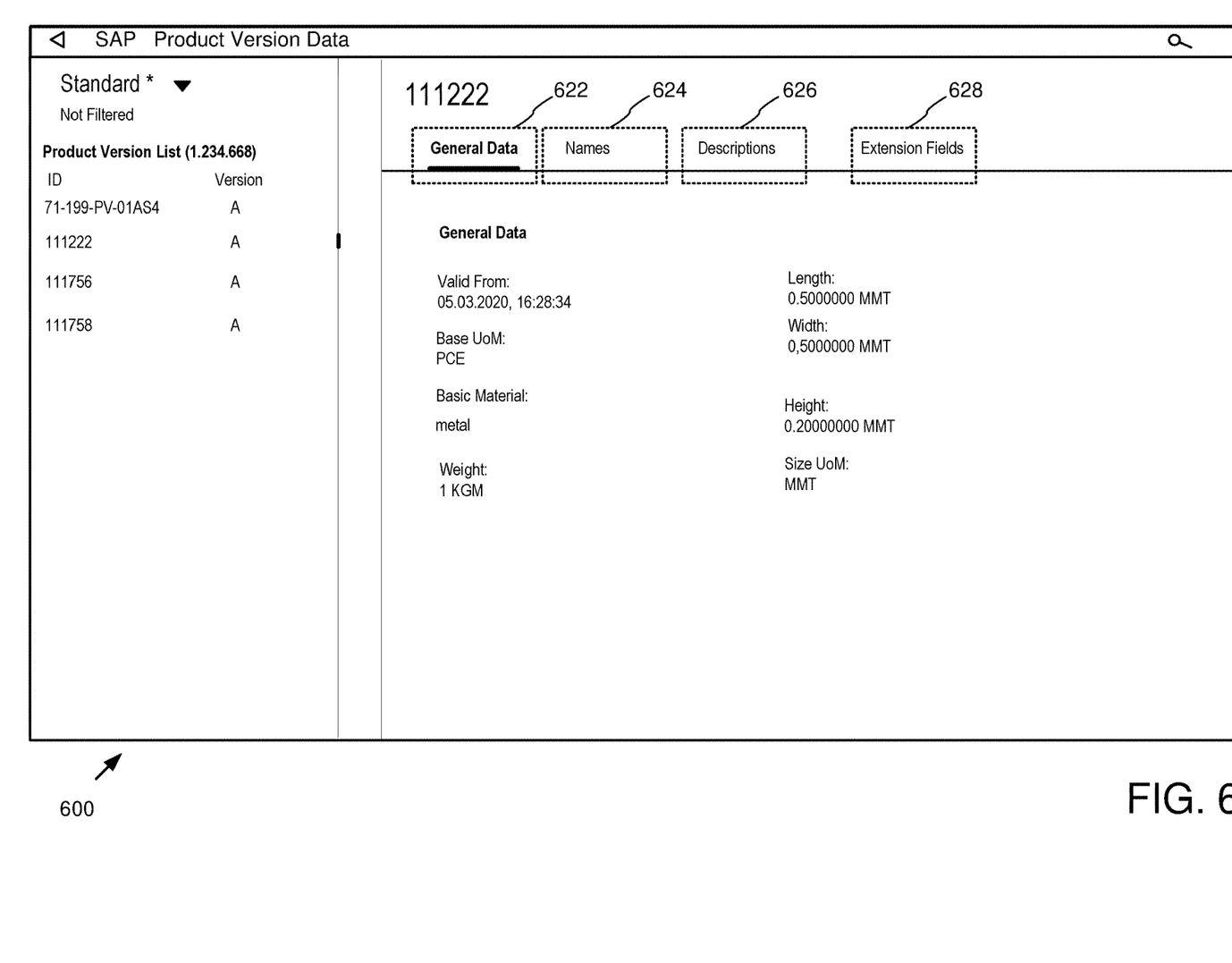
FIG. 6 is a screen shot of an example user interface with facets.

FIG. 6 is a screen shot of an example user interface 600 with facets that can be used in any of the examples herein. The exact type of user interface is orthogonal to the technologies, but the example shows various panes displaying product version data as part of a product lifecycle management application. Information for the product instance "111222" is displayed across four facets 622, 624, 626, and 628. Currently, the facet 622 is being displayed. In practice, a resource request for the displayed attributes for the instance 111222 would be sent from the client computer to the primary server computer. Subsequently, a request for attributes displayed in other facets would be sent. At the primary server computer, the second request can be queued and fulfilled as described herein, while avoiding sending a second request for the data object to the secondary server, thus resulting in improved performance, reduction in memory requirements, and less total cost of ownership.

Example 14—Example Programming Model

In any of the examples herein, a variety of programming models can be used to implement the technologies. In practice, the programming model used at the primary platform can be different from that at the secondary platform.

For example, one implementation is developed using a RESTful programming model in the primary platform called the "ABAP RESTful application programming model (RAP)" supported by SAP SE of Walldorf, Germany. Such a programming model can be a stateless programming model. For example, it may be that a session identifier is supported to differentiate user sessions. The programming model of the secondary platform is typically different, and the technologies can operate independently of the programming model used to develop functionality at the secondary platform.

Example 15—Example Implementation Details

Figure 7:
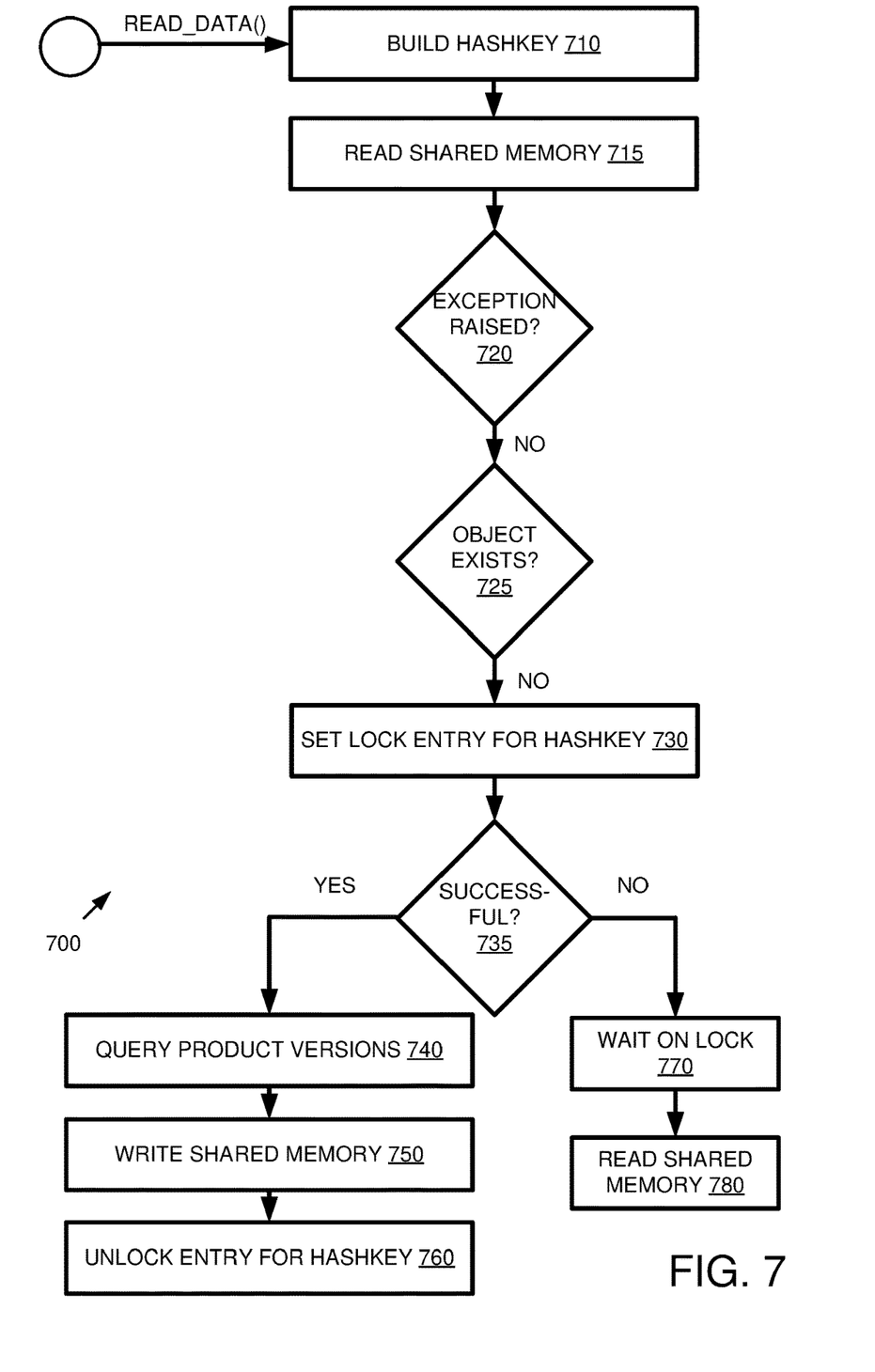
FIG. 7 is a flowchart of an example detailed implementation involving product versions.

FIG. 7 is a flowchart 700 of an example detailed implementation involving product versions; a similar approach can be used for other use cases. At 710, a hashkey is built. At 715, shared memory is read. If no exception is raised at 720, and the object does not exist at 725, the lock is set for the hashkey at 730. If successful at 735, the first request proceeds to query the product versions 740 from the secondary server, write the result into shared memory 750, and unlock the entry for the hashkey 760.

If not successful, the (subsequent) request waits on the lock 770 (e.g., s seconds, such as 0.1 seconds or the like, until the lock is released) and then reads attributes from shared memory at 780.

Example 16—Example Implementation Details

One implementation revolves around product lifecycle management (PLM) that involves data objects representing products, bills of material (BoMs), and the like. Bills of process (e.g., "routings") can also be supported.

The described functionality can be integrated into the Fiori framework and provided as a configurable feature.

In practice, the cache can be cleared (e.g., every x minutes) to avoid stale data.

Example 17—Example Implementations

Any of the following can be implemented.
Clause 1. A computer-implemented method comprising:
 at a primary server, from a client computer with a user interface comprising a plurality of facets, receiving a plurality of resource requests for attributes of a same data object instance stored at a secondary server to be displayed in the plurality of facets at the client computer;
 for a first resource request out of the resource requests for attributes of the same data object instance, requesting requested attributes of the data object instance from the secondary server;
 for a second resource request out of the resource requests for attributes of the same data object instance, responsive to determining that the first resource request for the data object instance has already been made, queuing the second resource request without relaying it to the secondary server;
 receiving the requested attributes of the data object instance from the secondary server;
 storing the received requested attributes of the data object instance; and
 fulfilling the queued, second resource request with the stored received requested attributes of the data object instance already received from the secondary server.

Clause 2. The method of Clause 1 wherein:
the requested attributes are stored in a shared memory cache; and
the second resource request reads one or more of the requested attributes from the shared memory cache.

Clause 3. The method of any one of Clauses 1-2 wherein:
for the first resource request, acquiring a lock; and
for the second resource request, waiting on the lock, wherein the lock is released responsive to fulfilling the first resource request.

Clause 4. The method of Clause 3 wherein:
the lock is identified via a hashkey calculated based on an identifier of the data object instance and a user identifier.

Clause 5. The method of any one of Clauses 1-4 wherein:
determining whether a first request has already been made comprises calculating a hashkey based on an identifier of the data object instance and a user identifier.

Clause 6. The method of any one of Clauses 1-5 further comprising:
after fulfilling the second resource request, dequeuing the second resource request.

Clause 7. The method of any one of Clauses 1-6 wherein:
the primary server is part of a first platform; and
the secondary server is part of a second platform of a different type than the first platform.

Clause 8. The method of Clause 7 wherein:
the first platform supports finer grained access to data object instance attributes than the second platform.

Clause 9. The method of any one of Clauses 1-8 wherein:
the secondary server provides product version information; and
the data object instance represents the product version information.

Clause 10. The method of any one of Clauses 1-9 wherein:
the secondary server does not support fine-grained access to attributes of the data object instance.

Clause 11. The method of any one of Clauses 1-10 wherein:
the requested attributes of the data object instance comprise a full set of attributes of the data object instance; and
the attributes of the first resource request are a proper subset of the full set of attributes.

Clause 12. The method of any one of Clauses 1-11 wherein:
the second resource request comprises a request for at least one attribute of the same data object instance that is not requested by the first resource request.

Clause 13. The method of any one of Clauses 1-12 wherein:
the plurality of facets display different attributes of the data object instance.

Clause 14. The method of any one of Clauses 1-13 wherein:
the requested attributes of the data object instance are included in an integrated hybrid object that comprises attributes managed natively and attributes managed at the secondary server, whereby data federation without replication is implemented.

Clause 15. The method of any one of Clauses 1-14 wherein:
the first resource request comprises an OData request.

Clause 16. A system comprising:
a client computer displaying a plurality of facets in a user interface, wherein the client computer is configured to send a plurality of resource requests for attributes of a data object instance to be displayed in the plurality of facets;
a primary server computer configured to receive and fulfill the resource requests for attributes of the data object instance from the client computer, wherein the primary server computer is configured to queue a second resource request for attributes of the data object instance responsive to determining that a first resource request for attributes of the data object instance has already been received;
wherein the primary server computer comprises a shared memory and is further configured to store the attributes of the data object instance received as a result of the first resource request to a secondary server computer in the shared memory and provide access to the attributes in the shared memory to the queued, second resource request, whereby a separate resource request to the secondary server computer for the second resource request for attributes of the data object instance is avoided.

Clause 17. The system of Clause 16 wherein:
the primary server computer operates as a RESTful Web service.

Clause 18. The system of any one of Clauses 16-17 wherein:
a lock identified by a hashkey computed based on a user identifier associated with both the first resource request and the second resource request; and
the second resource request is queued via the lock.

Clause 19. The system of Clause 18 wherein:
the hashkey is further based on an identifier of the data object instance.

Clause 20. One or more non-transitory computer-readable media having stored therein computer-executable instructions that when executed by a computing system, cause the computing system to perform:
at a primary server, from a client computer with a user interface comprising a plurality of facets, receiving a plurality of resource requests for attributes of a same data object instance stored at a secondary server to be displayed in the plurality of facets at the client computer;
for a first resource request out of the resource requests for attributes of the same data object instance, requesting a full set of requested attributes of the data object instance from the secondary server;
for a second resource request out of the resource requests for attributes of the same data object instance, responsive to determining that the first resource request for the data object instance has already been received, queuing the second resource request without relaying it to the secondary server, wherein the queuing employs a lock identified by hashkey calculated via a user identifier associated with both the first resource request and the second resource request;
receiving the full set of requested attributes of the data object instance from the secondary server;
storing the received full set of requested attributes of the data object instance; and
fulfilling the queued, second resource request from the stored full set of requested attributes of the data object instance already received from the secondary server, whereby a second resource request to the secondary server is avoided.

Clause 21. One or more computer-readable media having encoded thereon computer-executable instructions that, when executed by a computing system, cause the computing system to perform the method of any one of Clauses 1-15.

Clause 22. A computing system comprising:
at least one hardware processor;
at least one memory coupled to the at least one hardware processor; and
one or more non-transitory computer-readable media having stored therein computer-executable instructions that, when executed by the computing system, cause the computing system to perform the method of any one of Clauses 1-16.

Example 18—Example Advantages

A number of advantages can be achieved via the technologies described herein. For example, queuing resource requests instead of relaying them to the secondary server reduces the number of requests sent to the secondary server, resulting in reducing the payload sent across the system. Blocking resource requests with a lock uses an available mechanism to coordinate the requests across users and data object instances.

In situations involving multiple facets in a user interface as shown, numerous resource requests are generated, so the performance benefit is significant. The benefit is especially apparent in large systems involving many users who are accessing computing systems that are generating many resource requests.

The shortcomings of system design can be mitigated as shown, allowing the technologies to improve the overall system performance, taking not just the primary system, but the system landscape including the secondary server into account.

In a use case where the secondary server does not allow fine grained access to data object attributes, the numerous requests especially impact performance.

A further benefit is that two systems can be integrated while avoiding a replication scenario that introduces further overhead and data synchronization problems.

The benefits in a cloud environment are further evident in that total cost of ownership is reduced due to lower memory requirements, overall lower resource utilization, and the like.

Example 19—Example Computing Systems

Figure 8:
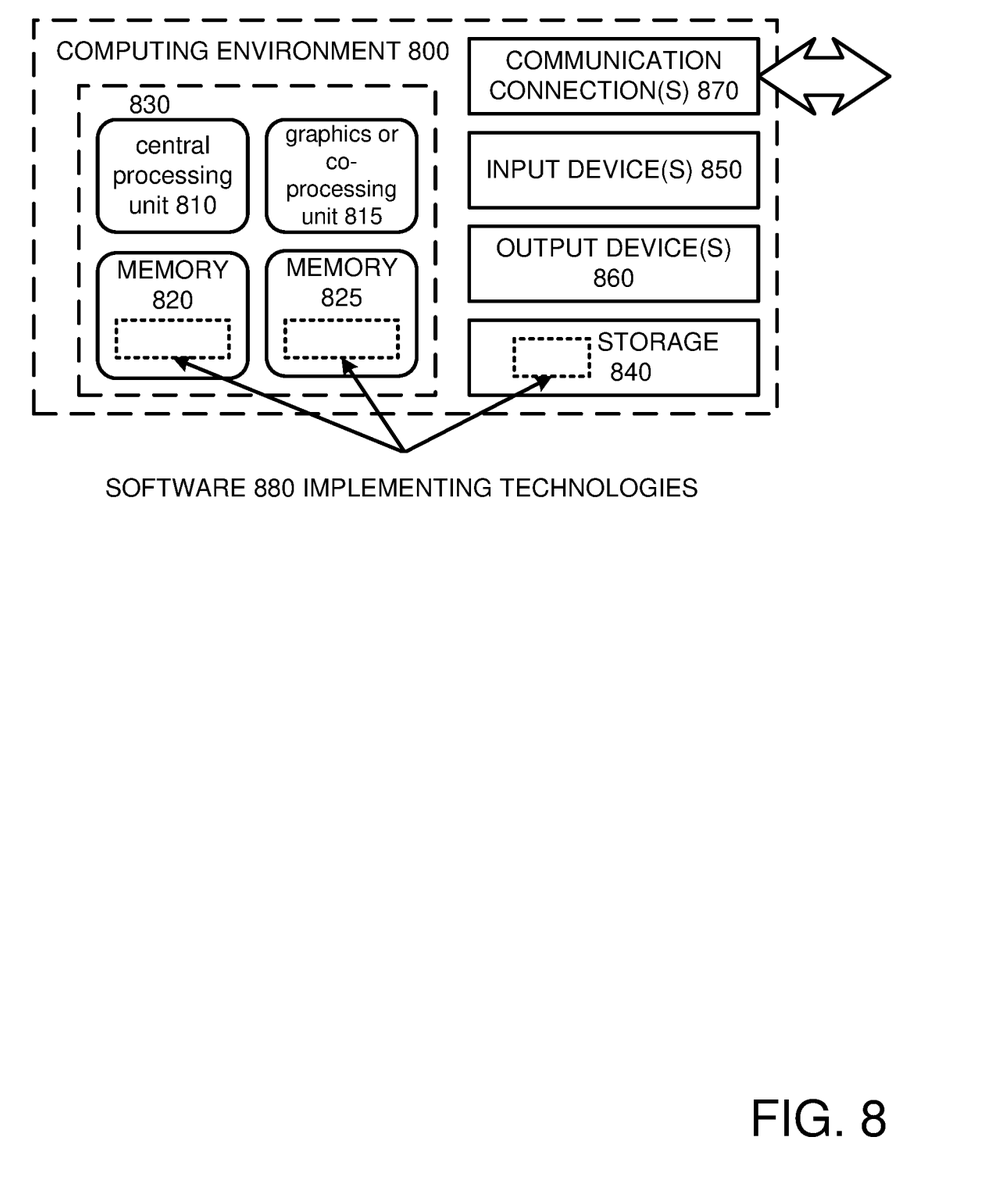
FIG. 8 is a block diagram of an example computing system in which described embodiments can be implemented.

FIG. 8 depicts an example of a suitable computing system 800 in which the described innovations can be implemented. The computing system 800 is not intended to suggest any limitation as to scope of use or functionality of the present disclosure, as the innovations can be implemented in diverse computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 can be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 can have additional features. For example, the computing system 800 includes storage 840, one or more input devices 850, one or more output devices 860, and one or more communication connections 870, including input devices, output devices, and communication connections for interacting with a user. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 can be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 can be an input device such as a keyboard, mouse, pen, or trackball, a voice input device, a scanning device, touch device (e.g., touchpad, display, or the like) or another device that provides input to the computing system 800. The output device(s) 860 can be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 20—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 21—Example Cloud Computing Environment

Figure 9:
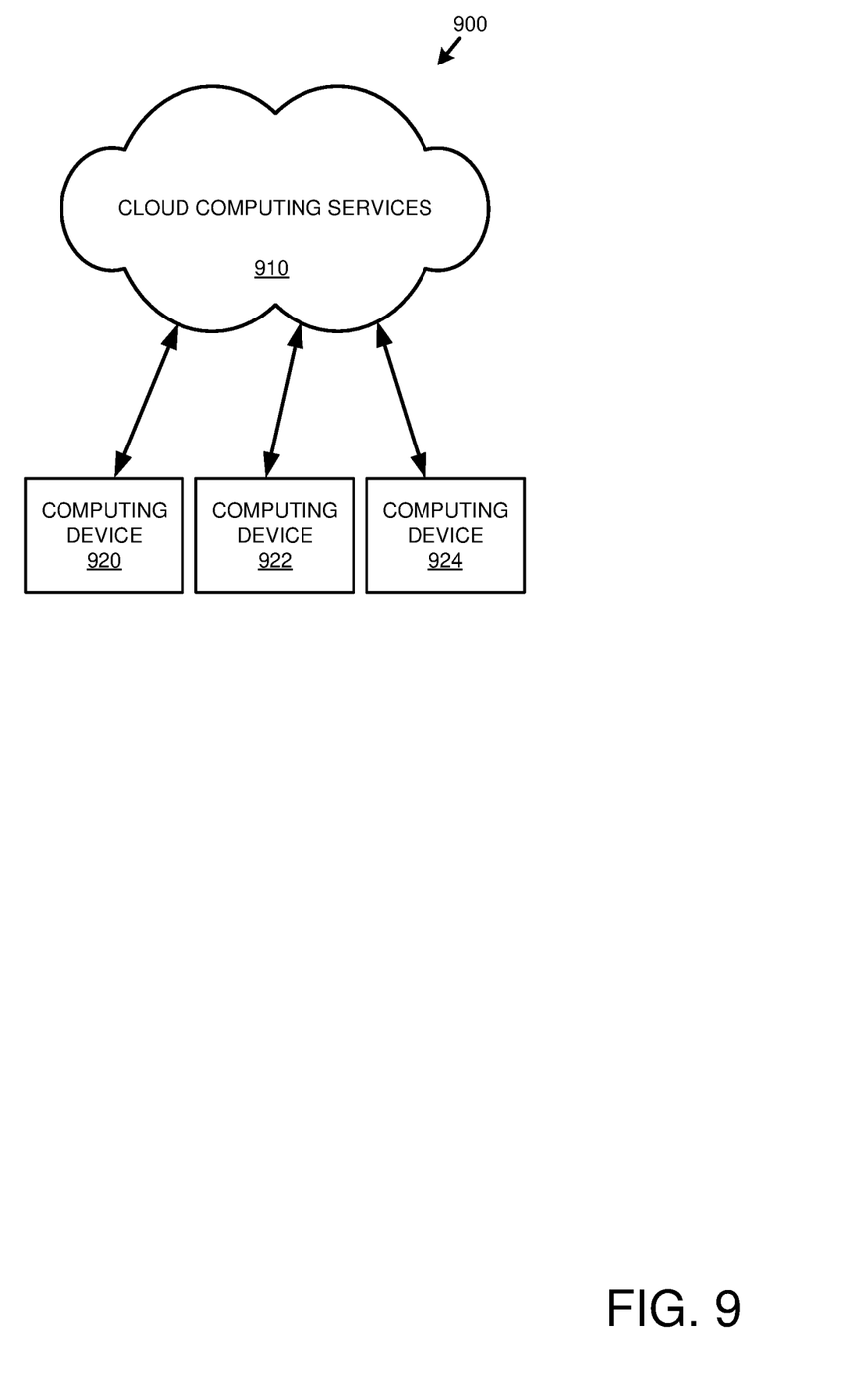
FIG. 9 is a block diagram of an example cloud computing environment that can be used in conjunction with the technologies described herein.

FIG. 9 depicts an example cloud computing environment 900 in which the described technologies can be implemented, including, e.g., the system 100 of FIG. 1 and other systems herein. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

In practice, cloud-based, on-premises-based, or hybrid scenarios can be supported.

Example 22—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 23—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
at a primary server, from a client computer with a user interface comprising a plurality of facets, receiving a plurality of resource requests for attributes of a same data object instance stored at a secondary server to be displayed in the plurality of facets at the client computer;
for a first resource request out of the resource requests for attributes of the same data object instance, requesting requested attributes of the data object instance from the secondary server;
for a second resource request out of the resource requests for attributes of the same data object instance, responsive to determining that the first resource request for the data object instance has already been made, queuing the second resource request without relaying it to the secondary server;
for the first resource request, acquiring a lock;
for the second resource request, waiting on the lock, wherein the lock is released responsive to fulfilling the first resource request;
receiving the requested attributes of the data object instance from the secondary server;
storing the received requested attributes of the data object instance; and
fulfilling the queued, second resource request with the stored received requested attributes of the data object instance already received from the secondary server.

2. The method of claim 1 wherein:
the requested attributes are stored in a shared memory cache; and
the second resource request reads one or more of the requested attributes from the shared memory cache.

3. The method of claim 1 wherein:
the lock is identified via a hashkey calculated based on an identifier of the data object instance and a user identifier.

4. The method of claim 1 wherein:
determining whether a first request has already been made comprises calculating a hashkey based on an identifier of the data object instance and a user identifier.

5. The method of claim 1 further comprising:
after fulfilling the second resource request, dequeuing the second resource request.

6. The method of claim 1 wherein:
the primary server is part of a first platform; and
the secondary server is part of a second platform of a different type than the first platform.

7. The method of claim 6 wherein:
the first platform supports finer grained access to data object instance attributes than the second platform.

8. The method of claim 1 wherein:
the secondary server provides product version information; and
the data object instance represents the product version information.

9. The method of claim 1 wherein:
the secondary server does not support fine-grained access to attributes of the data object instance.

10. The method of claim 1 wherein:
the requested attributes of the data object instance comprise a full set of attributes of the data object instance; and
the attributes of the first resource request are a proper subset of the full set of attributes.

11. The method of claim 1 wherein:
the second resource request comprises a request for at least one attribute of the same data object instance that is not requested by the first resource request.

12. The method of claim 1 wherein:
the plurality of facets display different attributes of the data object instance.

13. The method of claim 1 wherein:
the requested attributes of the data object instance are included in an integrated hybrid object that comprises attributes managed natively and attributes managed at the secondary server, whereby data federation without replication is implemented.

14. The method of claim 1 wherein:
the first resource request comprises an OData request.

15. A system comprising:
a client computer displaying a plurality of facets in a user interface, wherein the client computer is configured to send a plurality of resource requests for attributes of a data object instance to be displayed in the plurality of facets;
a primary server computer configured to receive and fulfill the resource requests for attributes of the data object instance from the client computer, wherein the primary server computer is configured to queue a second resource request for attributes of the data object instance responsive to determining that a first resource request for attributes of the data object instance has already been received;
wherein:
the primary server computer comprises a shared memory and is further configured to store the attributes of the data object instance received as a result of the first resource request to a secondary server computer in the shared memory and provide access to the attributes in the shared memory to the queued, second resource request, whereby a separate resource request to the secondary server computer for the second resource request for attributes of the data object instance is avoided;
a lock is identified by a hashkey computed based on a user identifier associated with both the first resource request and the second resource request; and
the second resource request is queued via the lock.

16. The system of claim 15 wherein:
the primary server computer operates as a RESTful Web service.

17. The system of claim 15 wherein:
the hashkey is further based on an identifier of the data object instance.

18. One or more non-transitory computer-readable media having stored therein computer-executable instructions that when executed by a computing system, cause the computing system to perform:
at a primary server, from a client computer with a user interface comprising a plurality of facets, receiving a plurality of resource requests for attributes of a same data object instance stored at a secondary server to be displayed in the plurality of facets at the client computer;
for a first resource request out of the resource requests for attributes of the same data object instance, requesting a full set of requested attributes of the data object instance from the secondary server;
for a second resource request out of the resource requests for attributes of the same data object instance, responsive to determining that the first resource request for the data object instance has already been received, queuing the second resource request without relaying it to the secondary server, wherein the queuing employs a lock identified by a hashkey calculated via a user identifier associated with both the first resource request and the second resource request;
receiving the full set of requested attributes of the data object instance from the secondary server;
storing the received full set of requested attributes of the data object instance; and
fulfilling the queued, second resource request from the stored full set of requested attributes of the data object instance already received from the secondary server, whereby a second resource request to the secondary server is avoided.

* * * * *